(12) United States Patent
Schneider et al.

(10) Patent No.: US 6,361,103 B1
(45) Date of Patent: Mar. 26, 2002

(54) OPENABLE MOTOR VEHICLE ROOF WITH A TILTABLE COVER FOR CLOSING AND EXPOSING A CIRCULAR ROOF OPENING

(75) Inventors: Gerald Schneider, München; Christoph Lante, Gauling; Bernhard Wingen, Feldkirchen, all of (DE)

(73) Assignee: Webasto Karosseriesysteme GmbH, Stockdorf (DE)

( * ) Notice: Subject to any disclaimer, the term of this patent is extended or adjusted under 35 U.S.C. 154(b) by 0 days.

(21) Appl. No.: 09/413,757

(22) Filed: Oct. 6, 1999

(30) Foreign Application Priority Data

Oct. 7, 1998 (DE) .......................................... 198 46 159

(51) Int. Cl.[7] ................ B60J 7/02; B60J 7/22
(52) U.S. Cl. ............ 296/216.02; 296/217; 296/216.08; 296/223
(58) Field of Search ................ 296/216.01–216.02, 296/216.06–216.08, 223, 217; 49/41, 39; 454/129, 136

(56) References Cited

U.S. PATENT DOCUMENTS

| 925,294 | A | * | 6/1909 | Chleborad | .................... 49/41 |
| 2,211,367 | A | * | 8/1940 | Davey et al. | |
| 3,975,048 | A | | 8/1976 | Matusek | |
| 4,754,695 | A | | 7/1988 | Kovacic | |

FOREIGN PATENT DOCUMENTS

| DE | 1 555 871 | | 9/1972 | |
| DE | 34 40 186 | | 4/1986 | |
| FR | 2692849 | * | 12/1993 | ............ 296/216.02 |
| GB | 2165496 | * | 4/1986 | ................ 296/223 |
| GB | 2243346 | * | 10/1991 | ................ 296/223 |

* cited by examiner

Primary Examiner—Dennis H. Pedder
(74) Attorney, Agent, or Firm—Nixon Peabody LLP; David S. Safran

(57) ABSTRACT

An openable motor vehicle roof with a circular roof opening, a circular disk-shaped cover (1) which is located in the roof opening, and an actuating mechanism (20) for moving the cover (1) between a position which closes the roof opening and a tilted position which creates a ventilation gap in its edge area. The cover (1) is attached via the actuating mechanism (20) to a rotary frame (2) which mounted to rotate on a circular guide frame (9) which is attached permanently to the roof in the area of the roof opening edge.

16 Claims, 4 Drawing Sheets

OPENABLE MOTOR VEHICLE ROOF WITH A TILTABLE COVER FOR CLOSING AND EXPOSING A CIRCULAR ROOF OPENING

BACKGROUND OF THE INVENTION

1. Field of the Invention

The invention relates to a motor vehicle roof with a circular roof opening, a circular disk-shaped cover which is located in the roof opening, and a tilt mechanism for moving the cover between a position which closes the roof opening and a tilt position which creates a ventilation gap at its edge area.

2. Description of Related Art

Conventionally, roof openings which can be closed by means of a cover in motor vehicle roofs have a rectangular shape. However, circular roof openings are also known. In this case, there is a circular, disk-shaped cover to selectively close or at least partially expose the roof opening. For example, published German Patent Application 1 555 871 discloses mounting the circular disk-shaped cover in the vicinity of the edge to be able to swing around an axis which runs perpendicular to the cover plane. The cover can thus swivel, essentially within its plane, laterally and parallel to the roof surface into its open position in order to be able to expose the roof opening without a space requirement above the roof, optionally for passage of individuals and devices.

Published German Patent Application DE OS 34 40 186 discloses a motor vehicle with a semicircular roof opening and a semicircular cover which is pivotally mounted in a circular guide frame, optionally for complete clearance of the roof opening. On the semicircular cover, there is a lifting device which, on the one hand, is used to lift the rear edge of the cover which is in the closed position to be flush with and to engage the motor vehicle roof, and on the other hand, to lower this edge underneath the roof in order to enable rotary motion of the turntable underneath it.

A rotary sunroof is known from U.S. Pat. No. 3,975,048. This rotary sunroof has a circular frame on which a trapezoidal cover is pivotally mounted which either completely closes a trapezoidal roof opening which is located within the circular frame or at least partially clears it. On the inside of the cover there is a handling device by which the trapezoidal cover can be caused to rotate and can be locked in its closed position.

Another motor vehicle roof of the initially mentioned type is known from U.S. Pat. No. 4,754,695. The rectangular cover of this motor vehicle roof does not rotate in the circular roof opening but can be pivoted upward at its front edge or rear edge, i.e., front or rear with reference to a forward direction of travel. For this purpose, the bottom of the cover, in the front and rear area, is coupled to levers which have a cam follower at their lower end that fits into a respective cam track of a roof-mounted guide plate which is located underneath the cover running parallel to the cover. By a handle located underneath the guide plate, the guide plate can rotate, moving the cam track such that the circular-disk shaped cover can be raised on one end and at the same time can be lowered on the other end by displacement of the cam followers, and thereby the levers connected thereto.

SUMMARY OF THE INVENTION

A primary object of this invention is to devise a motor vehicle of the initially mentioned type which has a cover which can be titled into any rotary position with the aid of simple structural measures.

This object is achieved in accordance with the invention by the cover being arranged, on the one hand, to be able to rotate by preferably 360° in the roof opening, and on the other hand, it can be tilted independently of this rotation. In particular, object is achieved by providing a roof frame to which the cover is attached via the actuating mechanism and by rotary bearings of the rotary frame on a circular guide frame which is attached permanently to the roof in the area of the roof opening edge. The cover can be arranged tilted in any position by the combination of the actuating mechanism with a rotary frame and rotary bearing of the rotary frame in a guide frame.

Basically, in an ideal spherical cap shape of the cover, the arrangement in accordance with the invention can be made such that the cover, in any rotational position of the rotary frame, can be tilted with respect to the guide frame between the open and closed positions. Based on the actual shape of the cover, which does not have a spherical cap shape, the cover is locked in a locked position and can only be swung out of it into the ventilation position or lowered from it into the locked position. Furthermore, preferably several rotary positions of the rotary frame, and thus of the cover in the guide frame, are made available by catch and clamp means. One of these rotary positions is provided for more easily finding the locked position, which is preferably located in the back area of the roof opening with respect to a forward direction of travel. The catch means works until the cover has been moved into its raised position by the actuating mechanism. Only here is the catch means released, and thus, enables rotary movement of the rotary frame in the guide frame.

A simple and stable structure of the rotary frame calls for a Y-shaped configuration of this frame, the free ends of the legs of the Y-shaped frame fitting into a guide groove of the guide frame which is preferably formed by a guide frame with a U-shaped cross section. In the case of the Y-shaped rotary frame, the above described catch means is preferably attached to the free end of that leg which comes to rest on the line of symmetry of the two other legs which run in a V-shape relative to one another, and in the area of the free ends of these legs, the cover is connected via pivot bearings to the rotary frame with axes which run parallel to one another and which fix the tilt axis for the cover. The advantage of the Y-shaped rotary frame is moreover that at least one of its three legs always lies in a conveniently accessible area of the driver or passenger in order to turn the circular cover into the desired rotary position.

Advantageously, it is also provided that, on the inside edge of the cover, at least in one partial area of the periphery, there is a wind guide lip which is preferably made arched. The wind guide lip is preferably made in the entire area of the inside edge of the cover.

In the following, the invention is explained in detail using the drawings which show one embodiment of the invention.

DETAILED DESCRIPTION OF THE INVENTION

Figure 1:
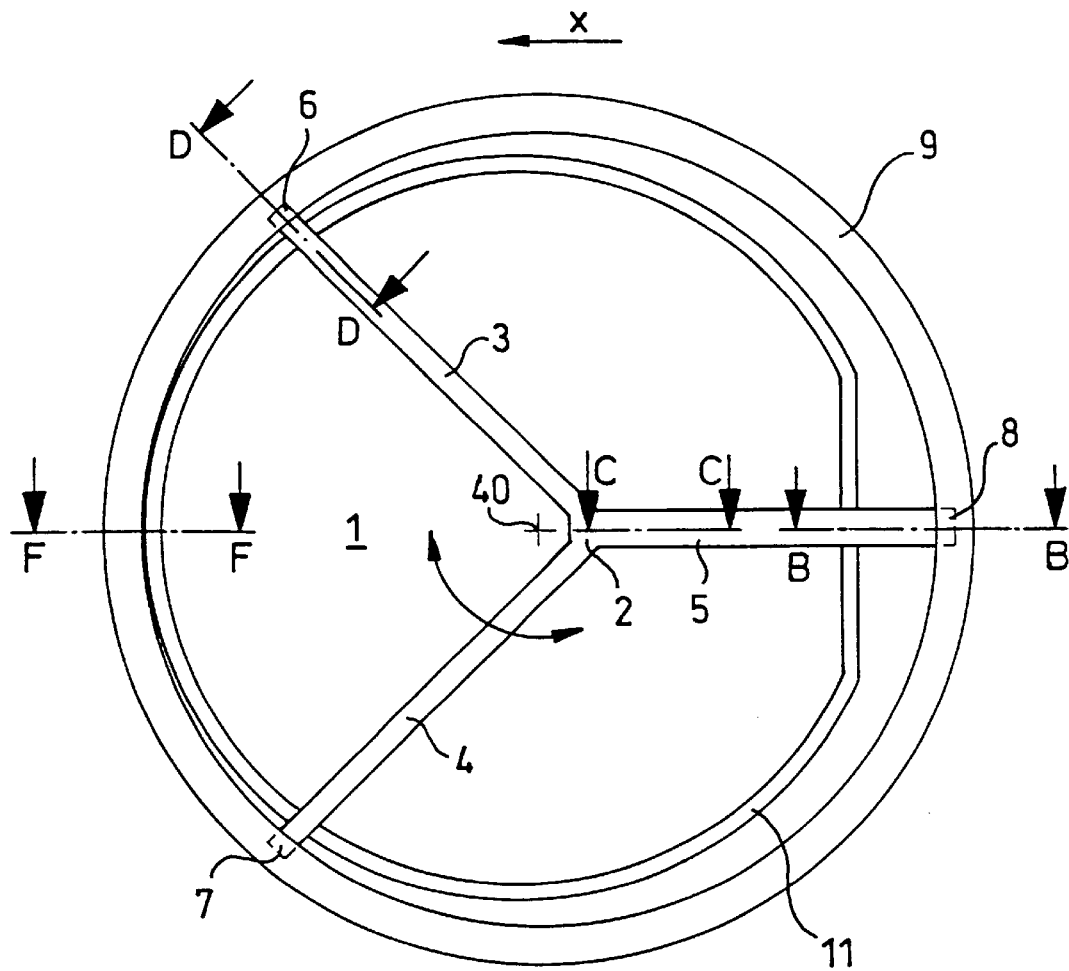
FIG. 1 is a plan view of one embodiment of the cover and its frame in the closed position.
Figure 2:
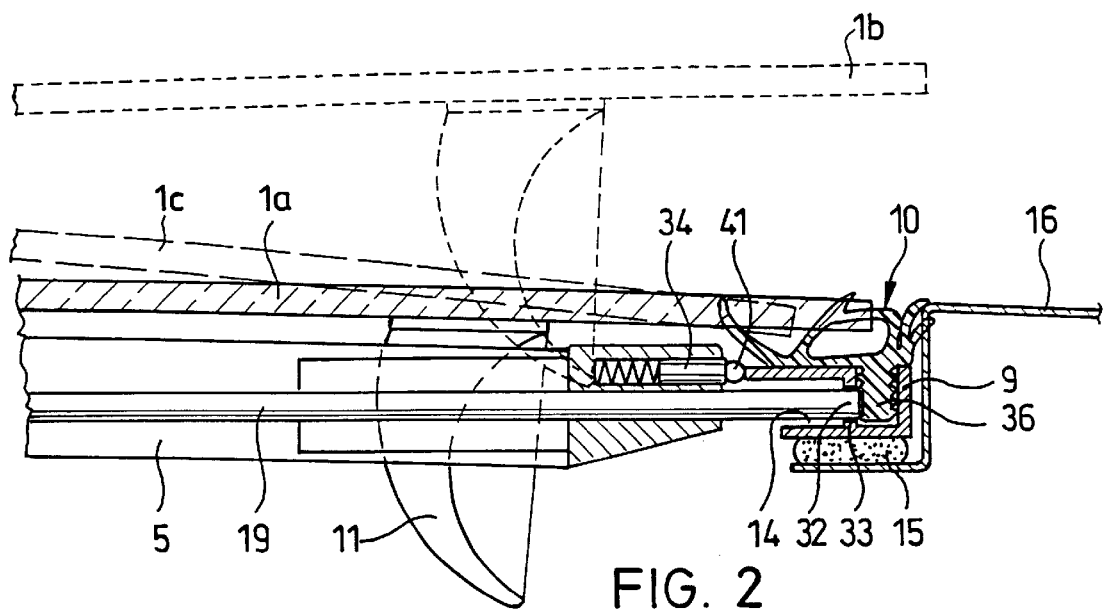
FIG. 2 is a sectional view taken along line B—B in FIG. 1 with two other positions of the over being shown in phantom outline.

FIG. 1 shows a motor vehicle roof in accordance with the present invention in which a cover 1 is provided which selectively closes or at least partially exposes a circular roof opening in a fixed motor vehicle roof 16 (FIG. 2). The cover 1 is connected to a preferably star-shaped or Y-shaped rotary frame 2. The rotary frame 2, preferably, has three legs 3, 4 and 5 with outside or free ends that have bearing elements 6, 7 and 8 which fit into a circular guide frame 9 within which the rotary frame 2 is held in a rotatable manner.

In addition, as shown in FIG. 2, the guide frame 9 comprises a seal 10 which is formed as a hollow seal with an additional sealing lip 37, seal 10 having a base 36 which is anchored securely in the guide frame 9. A wind guide lip 11 is attached to the underside of cover 1, radially inwardly from at least a partial area of its periphery edge.

The rotary frame 2 always fits with the bearing elements 6, 7, 8 of its three legs 3, 4, 5 into a circular guide groove 14 which is open towards the center of the cover 1 and which is formed in the guide frame 9. The guide frame 9 is permanently joined by means of a bead of cement 15 to the motor vehicle roof 16 in the area of its circular roof opening.

The capacity of the cover 1 to rotate is linked, according to the invention, with the tilting capacity of the cover 1, such that it can be tilted from its closed position into a tilted open position on a section which is a rear section with reference to the direction of travel x in FIG. 1 in order to selectively allow air into the passenger compartment or to route it out. For this reason, there is a tilt mechanism between the cover 1 and the rotary frame 2. The tilt mechanism can be made in the form of a lever mechanism, a spindle arrangement or any other embodiment which is known for lifting roofs which are actuated manually or by motor. A guide comprised of a guide crank 17, which rises obliquely to the rear in the lengthwise direction of the vehicle, and a bearing pin guided therein is added to this actuating mechanism in the area of each of the leg ends 6 and 7. The bearing pins 18 are parallel with one another and are perpendicular to the third leg 5 of the rotary frame 2. In other words, the rotary frame 2, and thus the cover 1, can be tilted or swung around the bearing pins 18. To enable this tilting of the cover 1, the actuating mechanism comprises an actuating arrangement for lifting or lowering the cover 1 which is composed of levers and arms and which is generally labeled with reference number 20 in FIG. 3.

Figure 3:
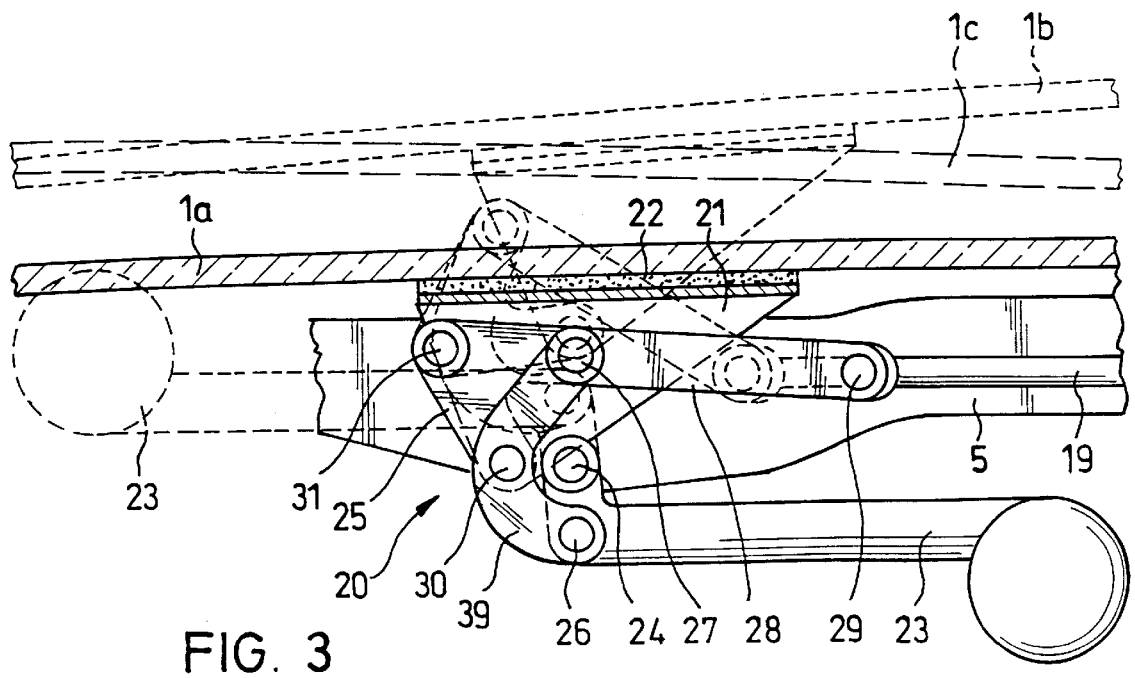
FIG. 3 is a sectional view taken along line C—C in FIG. 1 with different positions of the with two other positions of the cover and actuating mechanism being shown in phantom outline.

The structure of the actuating arrangement 20 is now explained in particular with reference to FIG. 3 which shows a section taken along line C—C in FIG. 1, viewed in the direction of the section arrows. FIG. 3 shows the cover 1 in its closed position with continuous lines and it is identified with reference number 1a. In its tilted position, the cover 1 in FIG. 3 is shown with short dashes and is labeled with reference number 1b. The position of the cover 1 in FIG. 3 is shown turned by 180° using long dashes and reference number 1c.

The actuating arrangement comprises a U-shaped bracket 21 which is preferably permanently connected to the cover 1 via a bead of cement 22.

As follows from FIG. 2, the bolt 19, with its end 32 which is spaced away from the actuating arrangement 20, fits into a recess 33 of the guide frame 9 which penetrates the base of the U-shaped guide frame 9. The rotary frame 2 and thus the cover 1 are held rotationally fixed in the guide frame 9 by fitting end 32 of the bolt 19 into the recess 33 of the guide frame 9. In this way, not only is rotation of the rotary frame 2 and thus of the cover 1 within the guide frame 9 suppressed, but the cover 1 is thus also locked in its closed position on the guide frame 9 via the bolt 19. The bolt 19 is uncoupled in the last phase of the pivoting motion of the actuating lever 23 of the actuating arrangement 20, which results in tilting of the cover 1 into its open position proceeding from the closed position of the cover 1 (cover 1a) with the rotary frame 2, and thus the cover 1, being rotationally locked. Conversely, the cover 1 can be lowered during closing only in the defined locked position when previously the bolt 19 has been moved into its position which is in front of the recess 33.

In the following, the actuating mechanism for swinging out the cover and release of the lock is described. The raising mechanism 20 comprises an actuating lever 23 which is provided on one end with a knob-shaped handle. The other end of the actuating lever 23 is bent upward and is supported on the rotary frame 2 by means of a pivot pin 24. At the bending point, the actuating lever 23 is pivotally connected to an end of a banana-shaped connecting lever 39 by means of a connecting pin 26. The opposite end of the banana-shaped connecting lever 39, which points upward, is pivotally connected via a connecting pin 27 to an angular lever 25. In the joint formed by the connecting pin 27, in addition, an end of a rod 28 is coupled, with the other end of rod 28 being connected to the bolt 19 by means of a connecting pin 29. The bolt 19 is guided on the rotary frame 2 such that it can be moved lengthwise only parallel to the leg 5 of the rotary frame 2 (see, FIG. 2).

The triangular lever 25 is pivotally mounted to the rotary frame 2 at its corner which is farthest left in the closed position in FIG. 3 via a pivot pin 31. On the end of its short leg, the angular lever 25 is coupled by means of a connecting pin 30 to a triangular bracket 21 which, for its part, is connected at its top surface to the underside of the cover 1. The connection is established in this embodiment by means of a bead 22 of cement.

When the actuating lever 23 is actuated from the closed position, which is shown in FIG. 3 with solid lines, into the raised position which is shown with broken lines, the actuating lever 23 is swung 180° clockwise. In this case, the connecting pin 26 moves on a circular path around the pivot pin 24. By coupling the connecting lever 39 to the triangular lever 25 via the connecting pin 27, the lever 25 executes rotary motion counterclockwise around the pivot pin 31. As a result of coupling of the triangular lever 25 to the bracket 21 via the connecting pin 30, the rear edge of the cover 1 is lifted into the raised position indicated in FIG. 3 with short dashes. At the same time, by coupling the triangular lever 25 to the rod 28 by means of the connecting pin 29, an upward pivoting of rod 28 takes place which causes the bolt 19 to be pulled out of the recess 33.

The cover 1 is now located in its raised position and is, at the same time, prepared for optional rotation by disengaging of the bolt 19, e.g., to the position represented by cover 1c.

The combination of the actuating arrangement 20 with the bolt 19 leads to the possibility of moving the cover 1b into its closed position only in the initial rotational position, specifically when the cover 1 assumes the position shown in FIG. 1 in which the leg 5 of the rotary frame 2 is in its position which points opposite the direction of travel X, the bolt 19 being located with its end 32 in front of the recess 33 in the guide frame 9. Only in this position is travel of the actuating lever 23, and thus the entire actuating arrangement 20, into the cover closed position achievable by the possibility of the bolt 19 fitting into the recess 33.

Several rotational catch positions are preferably provided for the rotary frame 2, including the rotational position shown in which the end 32 of the bolt 19 is located in front of the recess 33 in the guide fame 9. These catch positions can, for example, be implemented using an resilient thrust piece 34 (FIG. 2) which, as shown here, for example, can be comprised of a spring-loaded element which presses a ball element 41 outwardly into corresponding recesses located in the inside wall of the guide frame 9 at the desired catch positions.

Figure 5:
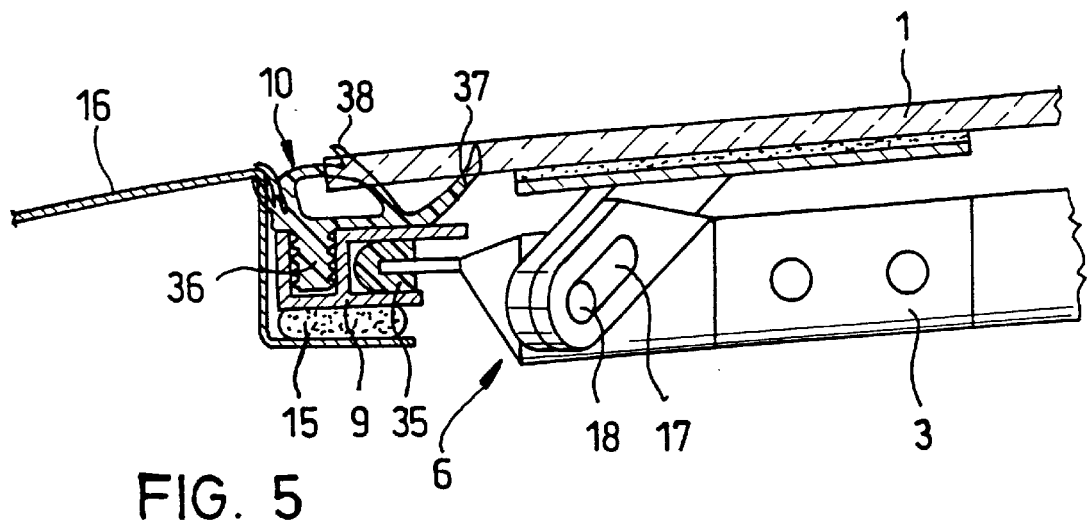
FIG. 5 is a partial sectional view taken along line D—D in FIG. 1.
Figure 6:
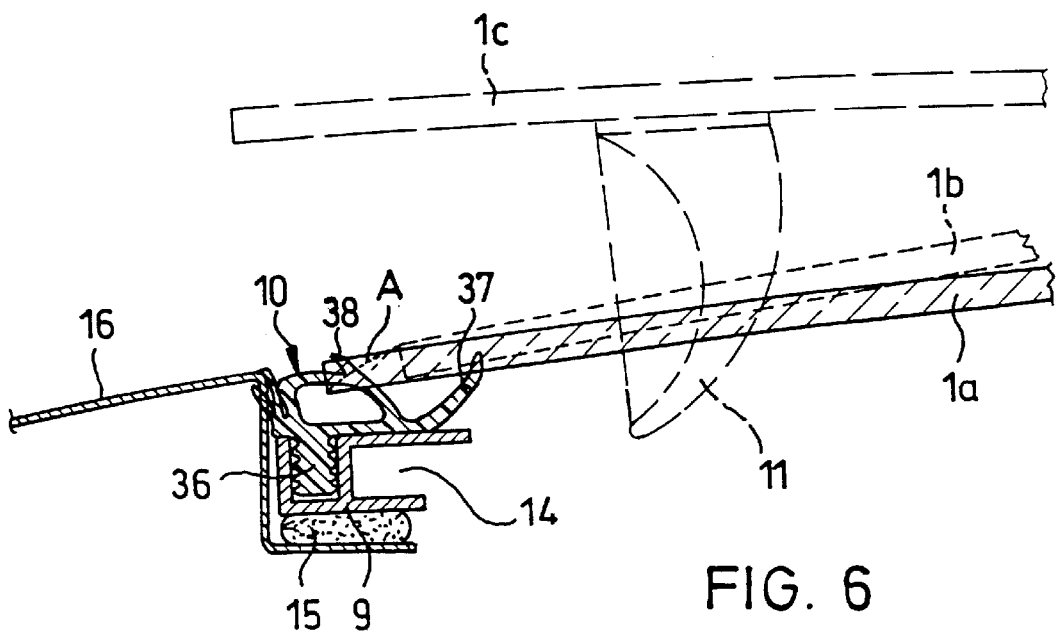
FIG. 6 is a partial sectional view taken along line F—F in FIG. 1.

As FIG. 5 clearly shows, the cover 1 is supported in the area of the bearing elements 6, 7 by two bearing pins 18 in guide slots 17 which rise obliquely upward toward the inside. When the rear edge of the cover 1 is swung out, by the superimposed motion of the cover, by means of the actuating mechanism 20 and the guidance of the bearing pin 18 in the guide slot 17 the front edge of the cover is guided on an arc-shaped path A (FIG. 6). In this way, the front edge of the cover 1 is first raised to break its contact with the top of the seal 10 and then is guided toward the inside and lowered again into the cover position 1B shown with small dash lines in FIG. 6. The front edge of the cover thus reaches into the free area of the seal 10 between the sealing lips 38 and 37, by which the wear of the seal is very greatly minimized when the cover 1 turns.

FIG. 5 shows, in particular, the end of the leg of the rotary frame 2 fitting into the U-shaped part of the guide frame 9, as a sectional representation taken along line D—D in FIG. 1. It follows from this representation that the bearing element 6 carries a guide shoe 35 which is held to slide in the U-shaped profile of the guide frame 9. Each of the three legs carries a guide shoe 35 in the same manner illustrated in FIG. 5, so that illustration of all three legs is not necessary to illustrate this feature, the presence of guide shoe 35 merely being indicated by the reference numeral therefor in FIG. 1 together with the bearing element numerals 6–8. Moreover, it follows from FIG. 5 that the cover seal 10 is inserted via a base 36 which is formed integrally with it into an open peripheral groove of the guide frame 9, the groove being likewise U-shaped in cross section. The hollow chamber seal 10, according to the embodiment shown in FIG. 5, comprises a large sealing lip 37 at the bottom of the chamber seal 10 which seals against the underside of the cover 1, and a small sealing lip 38 on the top of the hollow chamber seal 10 which projects outward, and with the cover 1 in the closed position, likewise adjoining its underside.

Figure 4:
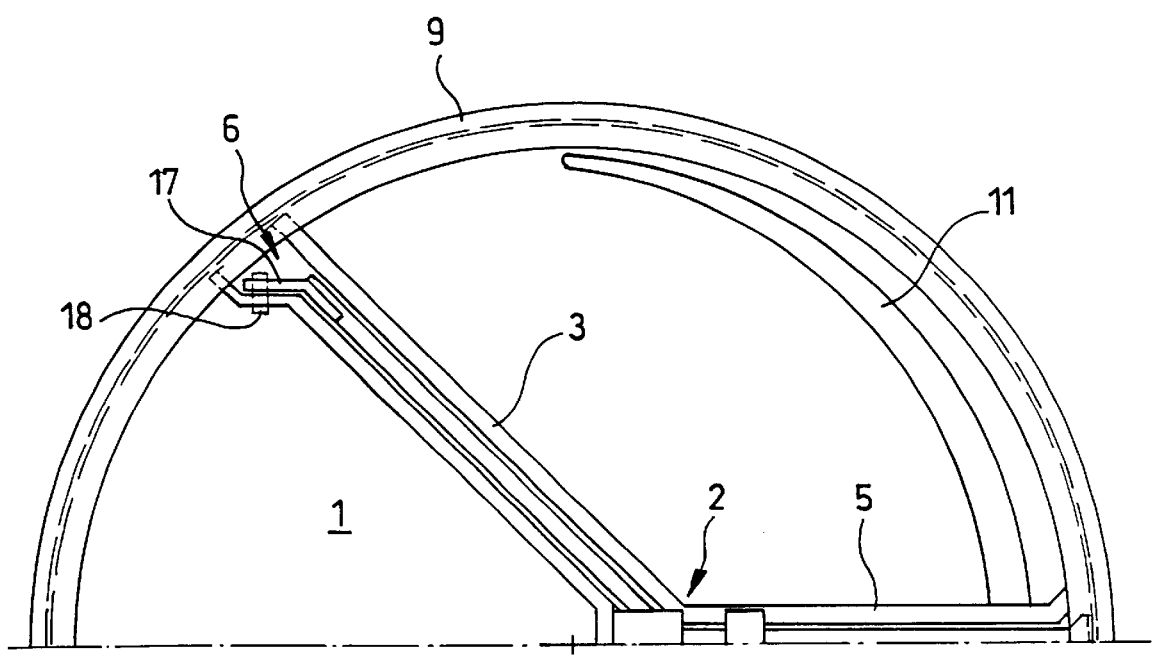
FIG. 4 is a detailed view of the upper half of the arrangement of FIG. 1.

As follows from FIG. 4, the wind guide lip 11, as shown in a plan view, is formed as a semicircular element with an overall height which decreases towards the outer ends and which is divided by the leg 5 into two parts of equal size, its free ends lying on a straight line which roughly intersects the center of the cover 40 in FIG. 1. In contrast FIG. 1 shows an alternative wind guide lip 11 which extends along the complete periphery of the cover 1 on its underside.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. An openable motor vehicle roof with a circular roof opening, a circular disk-shaped cover which is located in the roof opening, and an actuating arrangement for moving the cover between a position which closes the roof opening and a tilted up position which creates a ventilation gap in an edge area; wherein the cover is attached via the actuating arrangement to a rotary frame which is mounted to rotate on a circular guide frame, the circular guide frame being attached permanently to the roof in an area of an edge of the roof opening; wherein the rotary frame is locally supported on the circular guide frame only at separate locations spaced around the periphery of the circular guide frame by bearing elements provided on the rotary frame.

2. Openable motor vehicle roof as claimed in claim 1, wherein the rotary frame is supported to be able to rotate more than 360°.

3. Openable motor vehicle roof as claimed in claim 1, wherein the rotary frame is Y-shaped with three legs, each of which has one of the bearing elements on a free end thereof.

4. Openable motor vehicle roof as claimed in claim 1, wherein the actuating mechanism comprises a plurality of levers which are actuatable via a handle.

5. Openable motor vehicle roof as claimed in claim 4, wherein a catch mechanism is provided for disengageable catching of the rotary frame on the guide frame in at least one rotation position of the rotary frame.

6. Openable motor vehicle roof as claimed in claim 5, wherein said at least one position comprises a position in which the actuation mechanism can be activated for re-closing of the cover.

7. Openable motor vehicle roof as claimed in claim 6, wherein there is a peripheral cover seal on the guide frame which sealingly engages an inner side of the cover.

8. Openable motor vehicle roof as claimed in claim 6, wherein a wind guide lip is provided on an underside of the cover near a peripheral edge thereof, said wind guide lip extending along part at least of the periphery.

9. Openable motor vehicle roof as claimed in claim 1, wherein the actuating mechanism comprises a plurality of levers which are actuatable via a handle.

10. Openable motor vehicle roof as claimed in claim 9, wherein a catch mechanism is provided for disengageable catching of the rotary frame on the guide frame in at least one rotation position of the rotary frame.

11. Openable motor vehicle roof as claimed in claim 9, wherein said at least one position comprises a position in which the actuation mechanism can be activated for re-closing of the cover.

12. Openable motor vehicle roof as claimed in claim 1, wherein there is a peripheral cover seal on the guide frame which sealingly engages an inner side of the cover.

13. Openable motor vehicle roof as claimed in claim 1, wherein a wind guide lip is provided on an underside of the cover near a peripheral edge thereof, said wind guide lip extending along part at least of the periphery.

14. Openable motor vehicle roof as claimed in claim 13, wherein said wind guide lip extends along the complete periphery of the cover.

15. An openable motor vehicle roof with a circular roof opening, a circular disk-shaped cover which is located in the roof opening, and an actuating arrangement for moving the cover between a position which closes the roof opening and a tilted up position which creates a ventilation gap in an edge area; wherein the cover is attached via the actuating arrangement to a rotary frame which is mounted to rotate on a circular guide frame, the circular guide frame being attached permanently to the roof in an area of an edge of the roof opening; wherein the rotary frame is locally supported on the circular guide frame only at separate locations spaced around the periphery of the circular guide frame by bearing elements provided on the rotary frame; wherein the circular guide frame has a U-shaped cross section which is open in a radially inward direction for holding the rotary frame bearing elements.

16. An openable motor vehicle roof with a circular roof opening, a circular disk-shaped cover which is located in the roof opening, and an actuating arrangement for moving the cover between a position which closes the roof opening and a tilted up position which creates a ventilation gap in an edge area; wherein the cover is attached via the actuating arrangement to a rotary frame which is mounted to rotate on a circular guide frame, the circular guide frame being attached permanently to the roof in an area of an edge of the roof opening; wherein the rotary frame is locally supported on the circular guide frame only at separate locations spaced around the periphery of the circular guide frame by bearing elements provided on the rotary frame; wherein a wind guide lip is provided on an underside of the cover near a peripheral edge thereof, said wind guide lip extending along part at least of the periphery; and wherein said wind guide lip is semicircular and has a height which decreases from a center area toward its ends.

* * * * *